United States Patent [19]
Otake et al.

[11] Patent Number: 5,371,512
[45] Date of Patent: Dec. 6, 1994

[54] BACKGROUND PICTURE DISPLAY APPARATUS AND EXTERNAL STORAGE USED THEREFOR

[75] Inventors: Masahiro Otake, Kyoto; Toyofumi Takahashi, Tokyo; Satoshi Nishiumi, Kyoto; Michitaka Miyoshi, Tokyo, all of Japan

[73] Assignees: Nintendo Co., Ltd., Kyoto; Ricoh Co., Ltd., Tokyo, both of Japan

[21] Appl. No.: 792,206

[22] Filed: Nov. 13, 1991

[30] Foreign Application Priority Data

Nov. 19, 1990 [JP] Japan ................... 2-315003

[51] Int. Cl.⁵ ............................. G09G 3/00
[52] U.S. Cl. ........................... 345/114; 345/192
[58] Field of Search ............ 340/721, 726, 747, 725; 273/437; 358/183, 22; 345/115, 114, 113, 116, 121, 122, 123, 133

[56] References Cited

U.S. PATENT DOCUMENTS

| | | | |
|---|---|---|---|
| 4,070,662 | 1/1978 | Narveson | 340/726 |
| 4,561,659 | 12/1985 | Redfield et al. | 273/437 |
| 4,574,279 | 3/1986 | Roberts | 340/731 |
| 4,635,050 | 1/1987 | Grothe et al. | 340/726 |
| 4,672,541 | 6/1987 | Bromley et al. | 273/437 |
| 4,803,476 | 2/1989 | Knapton et al. | 340/748 |
| 4,824,106 | 4/1989 | Ueda et al. | |
| 4,868,552 | 9/1989 | Chang | 340/721 |
| 5,090,909 | 2/1992 | Keller et al. | 340/725 |

FOREIGN PATENT DOCUMENTS

| | | |
|---|---|---|
| 0133930 | 3/1985 | European Pat. Off. |
| 0323636 | 7/1989 | European Pat. Off. |
| 2104760A | 3/1989 | United Kingdom |

*Primary Examiner*—Ulysses Weldon
*Assistant Examiner*—Gin Goon
*Attorney, Agent, or Firm*—Nixon & Vanderhye

[57] ABSTRACT

A background picture display apparatus includes a microprocessor and an external storage unit, and dot data, character designating data and mode data are programmed in advance in a ROM in the external storage unit. Character designating data constituting background screens designated by the mode data and dot data of the respective characters used in the background screens are loaded in a RAM, that is, a screen RAM and a character RAM by a microprocessor. The character designating data is read from the screen RAM, and the dot data of the character is read from the character RAM. The dot data is converted into serial data by a parallel-serial conversion circuit, and a dot data combination circuit generates a color code for each background screen by combining the dot data and applies the same to a color generation circuit.

5 Claims, 19 Drawing Sheets

F I G. 1
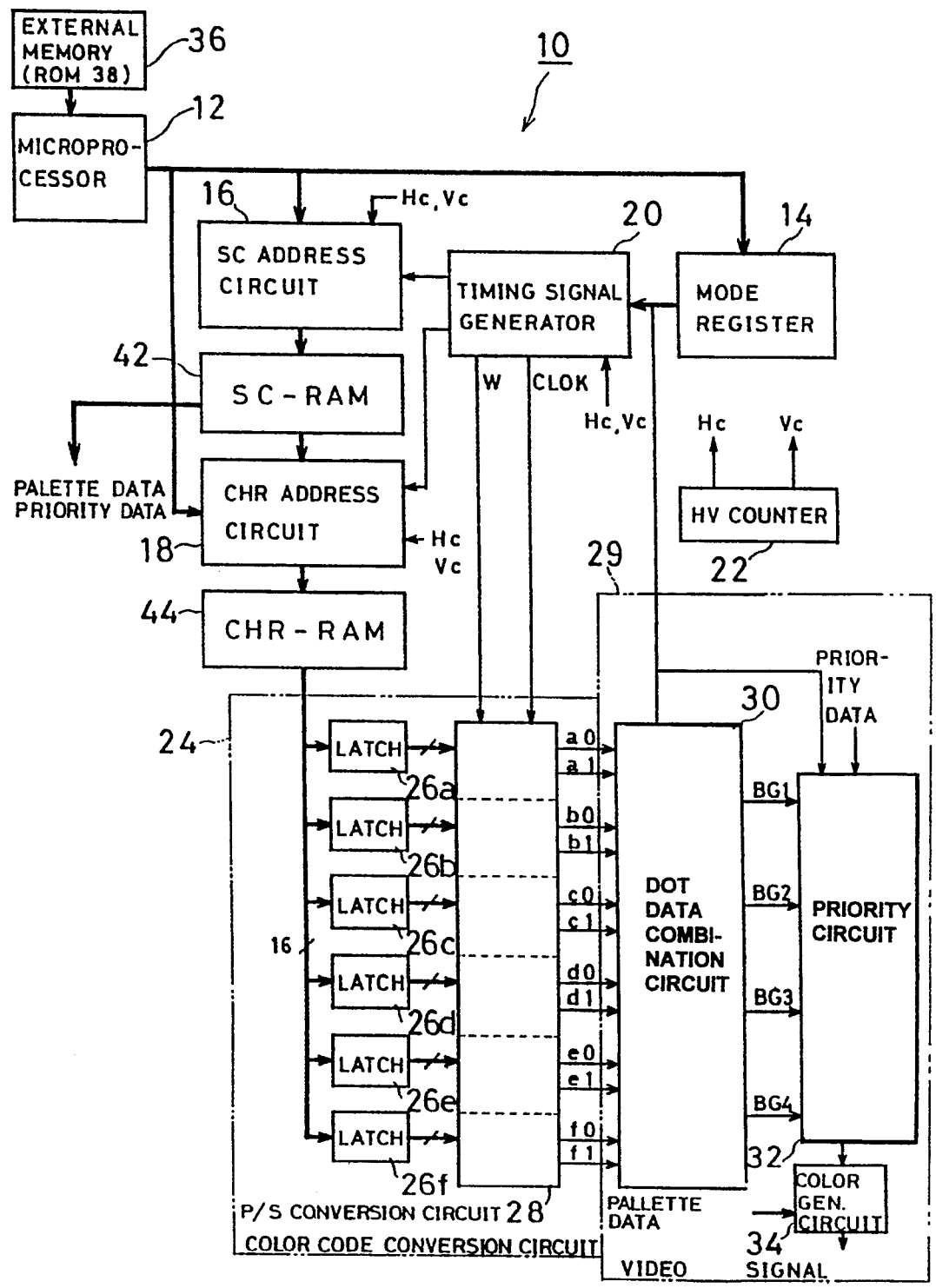

F I G. 12
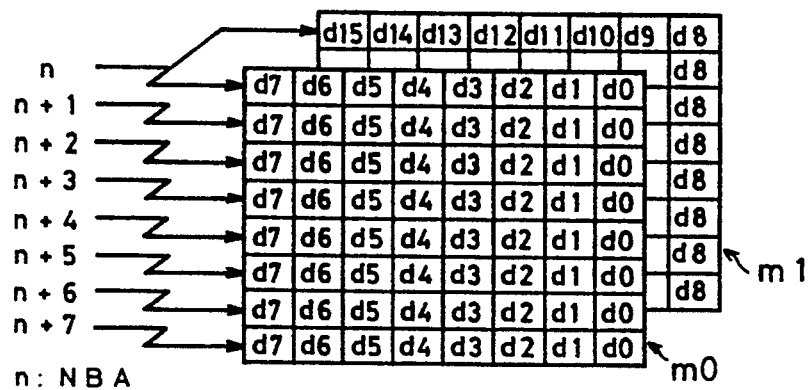
F I G. 13
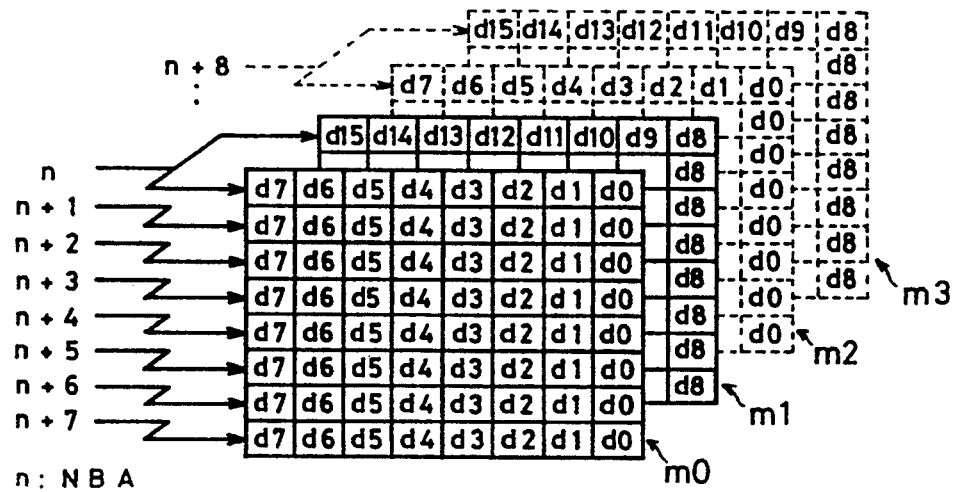

FIG.15

| MODE | NUMBER OF CELLS IN BG1-BG4 | NUMBER OF COLORS | NUMBER OF DOTS | OFFSET |
|---|---|---|---|---|
| 0 | BG1-BG4 → 2 | 4 | 8 | |
| 1 | BG1-BG2 → 4 | 16 | 8 | |
| | BG3 → 2 | 4 | 8 | |
| 2 | BG1-BG2 → 4 | 16 | 8 | CHANGEABLE |
| 3 | BG1 → 8 | 256 | 8 | |
| | BG2 → 4 | 16 | 8 | |
| 4 | BG1 → 8 | 256 | 8 | CHANGEABLE |
| | BG2 → 2 | 4 | 8 | |
| 5 | BG1 → 4 | 16 | 16 | |
| | BG2 → 2 | 4 | 16 | |
| 6 | BG1 → 4 | 16 | 16 | CHANGEABLE |

FIG. 16

| H COUNT VALUE | 0 | 1 | 2 | 3 | 4 | 5 | 6 | 7 | 8 | ... | 263 |
|---|---|---|---|---|---|---|---|---|---|---|---|
| CYCLE | T0 | T1 | T2 | T3 | T4 | T5 | T6 | T7 | T0 | ... | T7 |
| MODE 0 | BG4 SC | BG3 SC | BG2 SC | BG1 SC | BG4 CHR | BG3 CHR | BG2 CHR | BG1 CHR | BG4 SC | ... | BG1 CHR (d0,d1) |
| MODE 1 | BG3 SC | BG2 SC | BG1 SC | BG3 CHR | BG2 CHR | BG2 CHR | BG1 CHR | BG1 CHR | BG3 SC | ... | BG1 CHR2 |
| MODE 2 | BG2 SC | BG1 SC | (BG3) Hoffset | (BG3) Voffset | BG2 CHR1 | BG2 CHR2 | BG1 CHR1 | BG1 CHR2 | BG2 SC | ... | BG1 CHR2 |
| MODE 3 | BG2 SC | BG1 SC | BG2 CHR1 | BG2 CHR2 | BG2 CHR1 | BG2 CHR2 | BG1 CHR1 | BG1 CHR2 | BG2 SC | ... | BG1 CHR2 |
| MODE 4 | BG2 SC | BG1 SC | (BG3) Hoffset Voffset | BG2 CHR | BG1 CHR1 | BG1 CHR2 | BG1 CHR3 | BG1 CHR4 | BG2 SC | ... | BG1 CHR4 |
| MODE 5 | BG2 SC | BG1 SC | BG2 CHR1 | BG2 CHR1' | BG1 CHR1 | BG1 CHR1' | BG1 CHR2 | BG1 CHR2' | BG2 SC | ... | BG1 CHR2' |
| MODE 6 | BG1 SC | — | (BG3) Hoffset | (BG3) Voffset | BG1 CHR1 | BG1 CHR1' | BG1 CHR2 | BG1 CHR2' | BG1 SC | ... | BG1 CHR2' |

BACKGROUND PICTURE DISPLAY APPARATUS AND EXTERNAL STORAGE USED THEREFOR

BACKGROUND OF THE INVENTION

1. Field of the Invention

The present invention relates generally to a background picture display apparatus and an external storage unit used therefor. More particularly, the present invention relates to a background picture display apparatus requiring that a variety of background screens are displayed, such as a television game set, and an external storage unit used therefor.

2. Description of the Prior Art

An example of a picture display apparatus for displaying a background picture in a text system and displaying the background picture and a moving picture in combination is disclosed in Japanese Patent Publication No. 7478/1990 (corresponding to U.S. Pat. No. 4,824,106).

In the above described prior art, only one background screen can be displayed in one scene (frame). It is conceivable that the prior art is altered so as to display a plurality of background screens in one scene by increasing storage capacity. The amount of data which a microprocessor (CPU) used for picture display can process for a constant time is restricted, and an address space of the microprocessor is also restricted. Accordingly, the number of background screens constituting one scene, the number of cells constituting one background screen, the number of colors usable in each of the background screens, and etc. are naturally restricted. For example, if the number of cells constituting one background screen is increased, the number of colors per dot can be increased, while the number of background screens which can be displayed in one scene is decreased. On the other hand, if the number of cells is decreased, the number of background screens can be increased, while the number of colors per dot is decreased.

SUMMARY OF THE INVENTION

A principal object of the present invention is to provide background picture display apparatus capable of displaying a background picture having a variety of scenes by switching a plurality of background screens, and an external storage unit used therefor.

Another object of the present invention is to provide a background picture display apparatus capable of displaying a variety of background pictures with lesser storage capacity by efficiently using a memory, and an external storage unit used therefor.

A background picture display apparatus according to the present invention displays on a raster scan type display a background picture in which N characters and M characters each comprising a predetermined number of dots are respectively arranged in a horizontal direction and a vertical direction to represent one background screen and a plurality of background screens constitute one scene. The background picture display apparatus comprises mode data generation means (a ROM 38 in an external memory 36 and a microprocessor 12, in the embodiment) for generating mode data for designating the number of background screens constituting a scene and the number of cells used in each of the background screens, character designating data storage means (the ROM 38 and a screen RAM 42, in the embodiment) having a storage area which can store character designating data for designating N×M characters for each of the background screens whose number can be designated by the mode data generation means, dot data storage means (the ROM 38 and a character RAM 44, in the embodiment) for storing dot data of each of the plurality of characters each comprising not less than two cells per dot and designated by the character designating data, first reading means (a screen address circuit 16 in the embodiment) for reading the character designating data from the character designating data storage means in synchronization with horizontal scanning of the raster scan type display, second reading means (a character address circuit 18 in the embodiment) for reading from the dot data storage means the dot data of each of the characters designated by the character designating data in synchronization with horizontal scanning of the raster scan type display and on the basis of the character designating data read from the character designating data storage means, parallel-serial conversion means (a parallel-serial conversion circuit 28 in the embodiment) for temporarily storing the dot data read from the dot data storage means by the second reading means for each predetermined number in a bit parallel fashion and outputting the same in a bit serial fashion, output means (a dot data combination circuit 30 in the embodiment) for outputting dot data for each background screen designated by the mode data by combining the dot data outputted from the parallel-serial conversion means, and video signal generation means (a color generation circuit 34 in the embodiment) for generating a video signal on the basis of the dot data for each background screen outputted from the output means.

An external storage unit (an external memory 36 in the embodiment) according to the present invention is used for a background picture display apparatus. The background picture display apparatus displays on a raster scan type display a background image in which N characters and M characters each comprising a predetermined number of dots are respectively arranged in the horizontal direction and the vertical direction to represent one background screen and a plurality of background screens constitute one scene. The external storage unit comprises program data storage means (a ROM 38 in the embodiment) for storing program data required to display the background picture.

The program data storage means includes a mode data storage area (an area 38c in the ROM 38 in the embodiment) for storing mode data for designating the number of background screens constituting a scene and the number of cells used in each of the background screens, a dot data storage area (an area 38a in the ROM 38 in the embodiment) for storing dot data of a plurality of characters each comprising not less than two cells per dot, a character designating data storage area (an area 38b in the ROM 38 in the embodiment) having a storage area which can store character designating data for designating a maximum of N×M characters and their display positions for each of the background screens whose number can be designated by the above mode data, and a transfer program data storage area (an area 38d in the ROM 38 in the embodiment) for storing program data for transferring the above mode data, the above dot data and the above character designating data. The background picture display apparatus comprises a writable/readable memory (a RAM 40 in the embodiment), data transfer means (a microprocessor 12 in the embodiment) for transferring the character designating data and the dot data to the writable/readable memory on the basis of the transfer program data stored in the transfer program data storage means, mode data reading means (a mode register 14 in the embodiment) for reading the mode data from the mode data storage area, first reading means (a screen address circuit 16 in the embodiment) for reading the character designating data from the writable/readable memory in synchronization with horizontal scanning of the raster scan type display, second reading means (a character address circuit 18 in the embodiment) for reading from the writable/readable memory the dot data of each of the characters designated by the character designating data in synchronization with horizontal scanning of the raster scan type display, parallel-serial conversion means (a parallel-serial conversion circuit 28 in the embodiment) for temporarily storing the dot data read by the second reading means for each predetermined number in a bit parallel fashion and outputting the same in a bit serial fashion, output means (a dot data combination circuit 30 in the embodiment) for outputting dot data for each background screen designated by the mode data from the mode data reading means by combining the dot data outputted from the parallel-serial conversion means, and video signal generation means (a color generation circuit 34 in the embodiment) for generating a video signal on the basis of the dot data for each background screen outputted from the output means.

When the external memory 36 is connected to the background picture display apparatus 10, the respective character designating data constituting the background screens BG1 to BG4 and the dot data of the plurality of characters used in each of the background screens (BG1 to BG4) are respectively read from the character designating data storage area and the dot data storage area on the basis of the transfer program data stored in the transfer program data storage means such as the ROM 38, and are written into the writable/readable memory. At this time, the respective data are written into the writable/readable memory such as the RAM 40, that is, the screen RAM 42 and the character RAM 44 with a format shown in FIG. 3.

An HV counter 22 in the embodiment generates a count value Hc corresponding to the horizontal position of an electron beam and a count value Vc corresponding to the vertical position thereof in synchronization with electron beam scanning of the display. A timing signal generation circuit 20 generates signals in eight cycles, i.e., the 0-th cycle to the 7-th cycle while an electron beam is moved by one dot on the display, applies a 0-th cycle signal to a 3-rd cycle signal to the first reading means, that is, the screen address circuit 16, while applying a 4-th cycle signal to a 7-th cycle signal to the second reading means, that is, the character address circuit 18. The screen address circuit 18 generates addresses having screen base addresses SBA4, SBA3, SBA2 and SBA1 corresponding the background screens BG4, BG3, BG2 and BG1 added to an address representing a display position corresponding to the count values Hc and Vc at that time sequentially for each cycle at respective timings of the 0-th cycle to the 3-rd cycle, to designate a read address of the screen RAM 42. Responsively, the character designating data (see FIG. 11) is read from the screen RAM 42.

The character codes (d0 to d9) included in the character designating data constituting each of the background screens BG1 to BG4 are applied to the character address circuit 18 as data for designating an address of the character RAM 44. The character address circuit 18 outputs a character address on the basis of the character designating data constituting the background screens BG4 to BG1 sequentially read in the 0-th cycle to the 3-rd cycle and in synchronization with timings of the 4-th cycle to the 7-th cycle. Responsively, the dot data is read from the character RAM 44.

The dot data having names 0, n, 1 and 1023 read at the timings of the 4-th cycle to the 7-th cycle are latched in four latch circuits 26a to 26d of the latch circuit 26 (see FIG. 1), in this order, in a bit parallel fashion. The data, that is, color data of eight dots in the horizontal direction of one character which corresponds to a certain display position of each of the background screens BG1 to BG4 (data of two bits for designating four colors per dot) is applied in a bit parallel fashion to the parallel-serial conversion means, that is, the parallel-serial conversion circuit 28. The parallel-serial conversion circuit 28 reads the bit parallel data and temporarily stores the same in response to a write signal W from the timing signal generation circuit 20. The parallel-serial conversion circuit 28 converts the bit parallel data into bit serial data in synchronization with a read clock applied with a time interval which is two times a time interval during which an electron beam is moved by one dot, and applies the same to the dot data combination circuit 30.

The dot data combination circuit 30 combines pairs of serial data a0 and a1, b0 and b1, c0 and c1, d0 and d1, e0 and e1, and f0 and f1 outputted from the parallel-serial conversion circuit 28 to obtain data of bits whose number corresponds to the number of cells on the basis of the mode data. Accordingly, color data for each background screen (BG4 to BG1) is outputted and applied to the color generation circuit 34. The color generation circuit 34 generates a color video signal (an analog signal) determined by a combination of color data and palette data and applies the same to the display.

In the above described manner, the mode data is previously set, thereby to make it possible to arbitrarily set the number of background screens in each scene and a combination of the number of colors usable in each of the background screens.

According to the present invention, the mode data for designating the number of background screens constituting one scene and a combination of the number of cells and the number of colors used in each of the background screens is generated, and only necessary data is read from the dot data storage means and the character designating data storage means on the basis of the mode data, thereby to make it possible to maximize the capability of the microprocessor to display a picture within a limited processing time.

Furthermore, if dot data of characters and character designating data used for all scenes are stored in nonvolatile storage means, and only data of one scene (frame) is read and temporarily stored in the RAM or the like each time, it is possible to efficiently use the memory such as the RAM.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing one embodiment of the present invention;

FIG. 12 is an illustrative view showing a data structure of one character stored in a character RAM;

FIG. 13 is an illustrative view showing a data structure of one character stored in the character RAM;

FIG. 15 is an illustrative view showing the relation among the number of cells, the number of colors, the number of dots in the horizontal direction of one character, and the presence or absence of the offset change by mode;

FIG. 16 is an illustrative view showing a background picture processing cycle by mode for explaining an operation in the embodiment shown in FIG. 1;

DETAILED DESCRIPTION OF THE PREFERRED EMBODIMENTS

Figure 2:
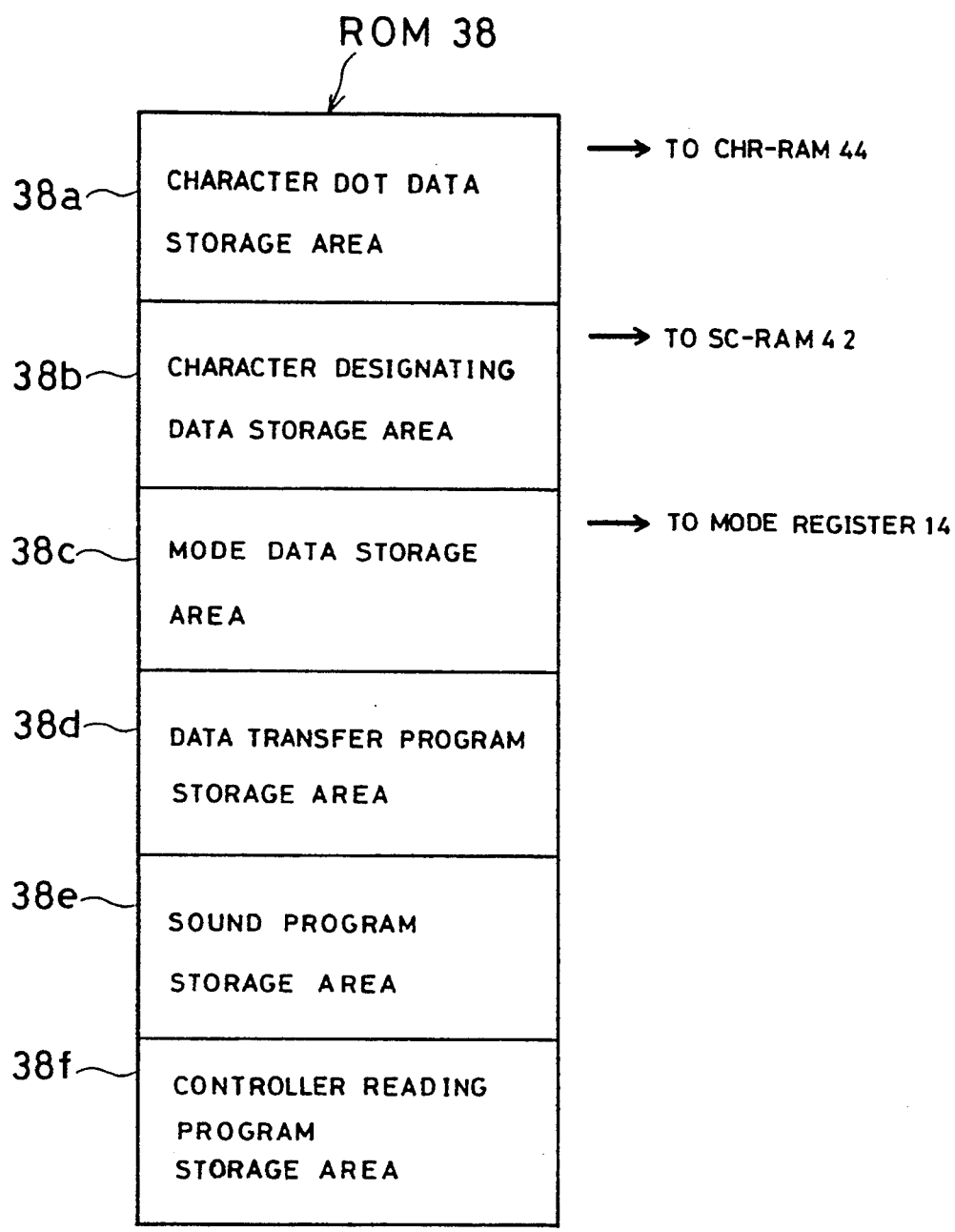
FIG. 2 is an illustrative view showing a memory map of a ROM included in an external memory.

A background picture display apparatus 10 in the embodiment shown in FIG. 1 is applied to a raster scan type display (not shown) which is one example of a display. The raster scan type display has a display screen comprising x dots in the horizontal direction and y dots in the vertical direction. When one character constituting a background picture has n dots in the horizontal direction and m dots in the vertical direction, a total of N×M characters comprising N (=x/n) characters in the horizontal direction and M (=y/m) characters in the vertical direction can be displayed on the display screen.

The background picture display apparatus 10 shown in FIG. 1 includes a microprocessor 12. The microprocessor 12 serves as writing control means for controlling writing of data into a writable/readable memory such as a RAM 40 (as described later). The RAM 40 includes a screen RAM 42 and a character RAM 44, as shown in FIGS. 3 to 9.

A mode register 14, a screen address circuit 16 for designating a write address and a read address of the screen RAM 42, and a character address circuit 18 for designating a write address and a read address of the character RAM 44 are connected to the microprocessor 12 through a data bus and an address bus. A timing signal generation circuit 20 is connected to the mode register 14. A count value Hc and a count value Vc respectively representing a horizontal scanning position and a vertical position of an electron beam on a display (not shown) are outputted from an HV counter 22 to the timing signal generation circuit 20. The timing signal generation circuit 20 applies a read control signal to the screen address circuit 16 and the character address circuit 18 sequentially for each cycle from the 0-th cycle to the 7-th cycle on the basis of the count values Hc and Vc from the HV counter 22. Consequently, character designating data and dot data are read from the screen RAM 42 and the character RAM 44 in eight cycles for each time period during which one dot is displayed on the display. However, decisions about which cycles are respectively used to apply the recording control signal to the screen address circuit 16 and the character address circuit 18 depend on which of BG modes 0 to 7 is represented by mode data in the mode register 14. In the embodiment, the read control signal is applied to the screen address circuit 16 in at least two cycles, i.e., the 0-th cycle and the 1-st cycle and at most four cycles, i.e., the 0-th cycle to 3-rd cycle, while being applied to the character address circuit 18 in at least four cycles, i.e., the 4-th cycle to 7-th cycle and at most six cycles, i.e., the 2-nd cycle to 7-th cycle.

The dot data read from the character RAM 44 is applied to latch circuits 26a to 26f included in a color code conversion circuit 24 in a bit parallel fashion. The number of the latch circuits 26a to 26f to be provided is the number associated with the number of background screens and the number of cells which are designated by the mode data (six corresponding to the maximum number of cycles designating reading from the character RAM 44 in the embodiment), and each of the latch circuits has storage elements (flip-flops) of 16 bits. The data latched in the latch circuits 26a to 26f are converted into bit serial data in a bit parallel fashion by a parallel-serial conversion circuit 28 and are applied to a dot data combination circuit 30 included in an output circuit 29 as serial data of two bits per dot. The dot data combination circuit 30 converts the bit serial data into a combination of dot data for each background screen (BG1 to BG4) such that the dot data is a combination of cells corresponding to the BG mode on the basis of the mode data from the mode register 14 and applies the same to a priority circuit 32. The priority circuit 32 applies dot data of a higher priority one of the background screens (BG1 to BG4) to a color generation circuit 34 as color designating data on the basis of a combination of priority data of one bit which together with a character name, are included in the character designating data. The color generation circuit 34 generates a color video signal (an analog signal) on the basis of palette data read from the screen RAM 42 and each of the dot data.

An external memory 36 containing a ROM 38 which is one example of a nonvolatile memory in a casing or cartridge (not shown) is detachably mounted on the microprocessor 12. This ROM 38 comprises a dot data storage area 38a, a character designating data storage area 38b, a mode data storage area 38c, and a data transfer (reading) program storage area 38d, as shown in a memory map of FIG. 2.

More specifically, the dot data storage area 38a has storage capacity storing dot pattern data (graphic data) of all characters displayed in all scenes, and stores dot data for each cell such that one dot (or one pixel) on the display is represented by not less than two cells. The character designating data storage area 38b has storage capacity of all background screens, and stores character designating data for designating a maximum of N×M characters for each background screen with respect to all the background screens. The mode data storage area 38c stores mode data, which mode data selects or designates not less than one of the maximum number of background screens (four screens BG1 to BG4 in the embodiment) which can be displayed in one scene, that is, one frame, and designates the number of cells in each of the background screens. This mode data is stored in relation to timings when background picture display modes (seven modes, i.e., BG mode 0 to BG mode 6 in the embodiment) are changed. The mode data may be stored for each display scene. The data transfer program storage area 38d stores a program for transferring data required for display in one scene out of the dot data, the character designating data and the mode data stored in the above described storage areas 38a to 38c to the screen RAM 42, the character RAM 44 and the mode register 14.

Furthermore, when the external memory 36 is used as a cartridge for a television game set, that is, the background picture display apparatus 10 is a television game set, the ROM 38 includes a sound program storage area 38e and a controller reading program storage area 38f, as shown in FIG. 2. The sound program storage area 38e stores program data for emitting music and a sound effect. The controller reading program storage area 38f stores program data for periodically detecting the operating state of a controller (not shown) connected to the television game set.

Referring to FIGS. 3 to 9, although the screen RAM 42 and the character RAM 44 are respectively constituted by memory spaces obtained by dividing one large-capacity RAM, two small-capacity RAMs may be respectively used as the screen RAM 42 and the character RAM 44. Assuming a case where a storage area equal to four screens is required per background screen for scrolling, the screen RAM 42 requires capacity of 32×32×4=4096 words (approximately 4K words), that is, 8192=8K bytes per background screen (BG) because one word is equal to two bytes. Consequently, in a case in the BG mode 0 where a maximum of four background screens BG1 to BG4 are used, 8192×4=32K bytes, which is four times the above described capacity is required. The first addresses in regions for storing the respective character designating data constituting the background screens BG1 to BG4 in the screen RAM 42 are respectively determined as screen base addresses (SBA1-SBA4). However, a part of the screen base addresses (SBA1-SBA4) may not exist in some modes.

Figure 10:
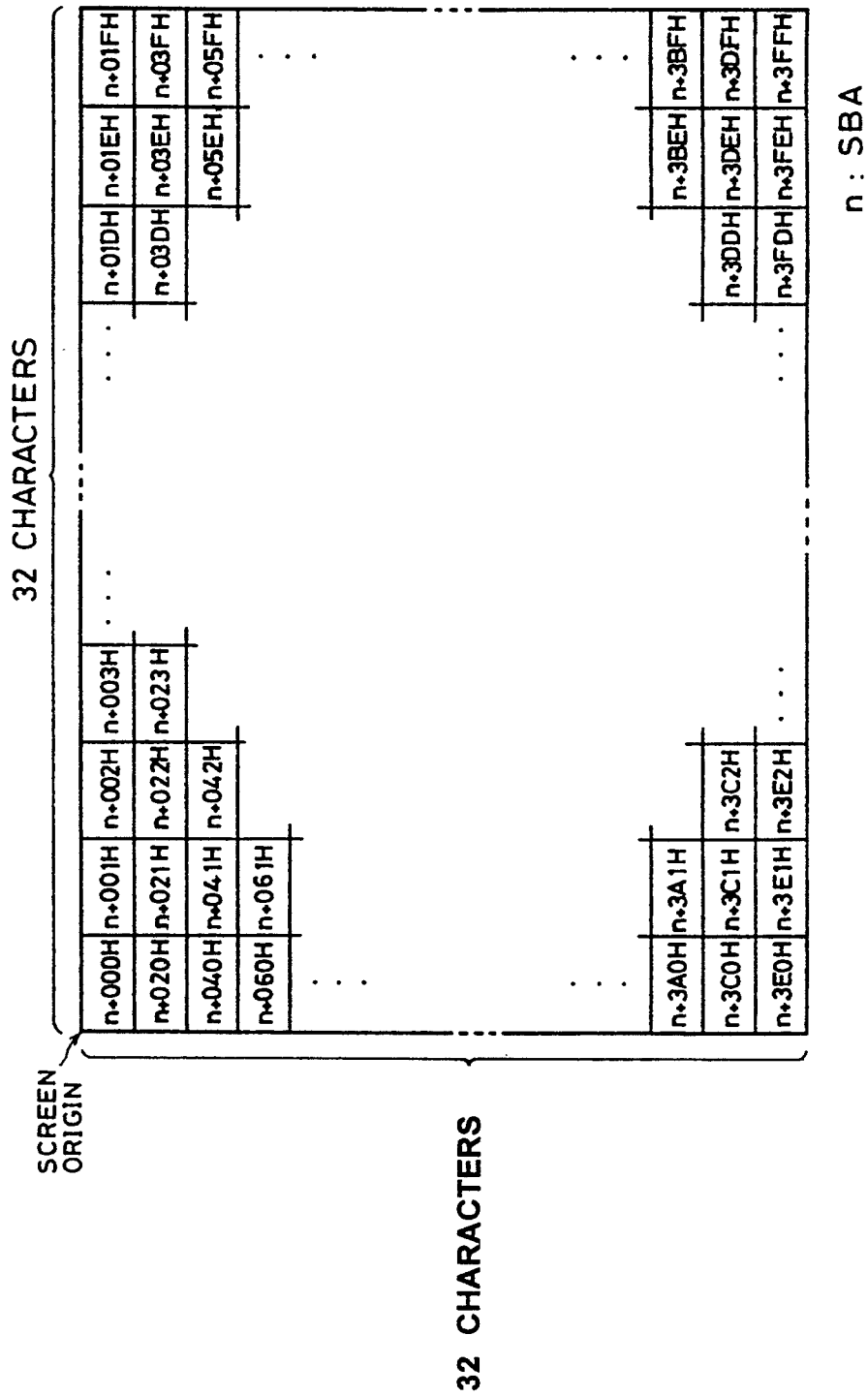
FIG. 10 is an illustrative view showing a state where data of one background screen is stored.
Figure 11:
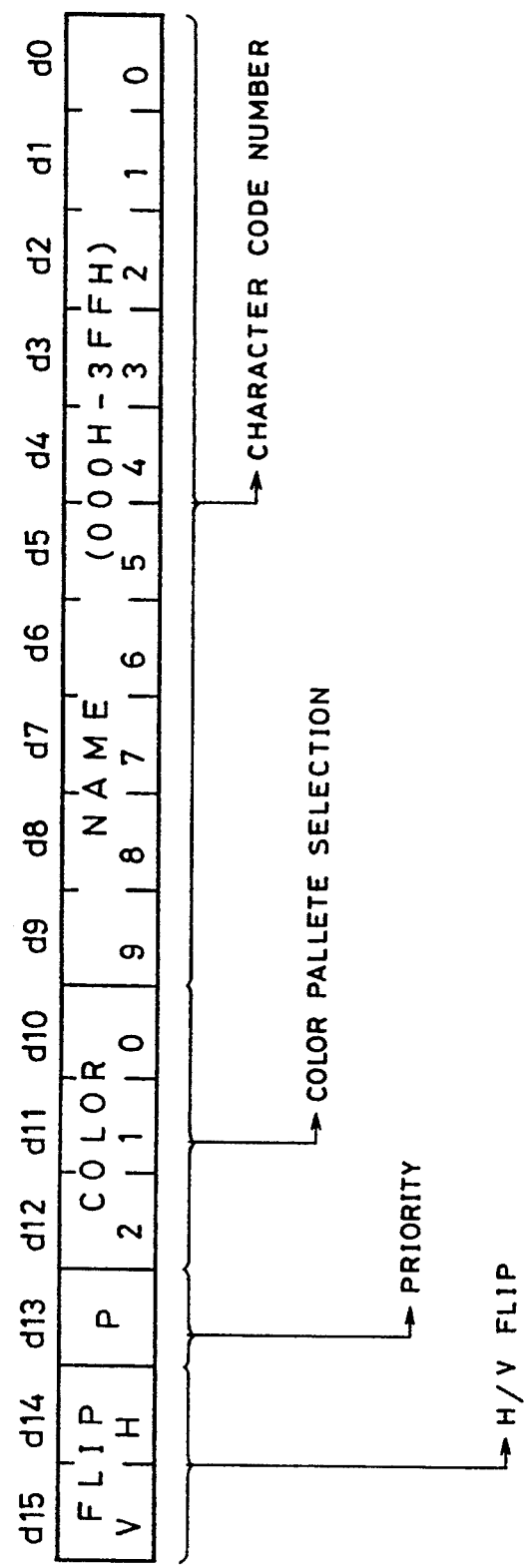
FIG. 11 is an illustrative view showing a data format of one character in a screen RAM.

The relation between an address space of any one of the background screens BG1 to BG4 in the screen RAM 42 and the screen base addresses (SBA) is as shown in FIG. 10. When SBA is represented by n (=a real address of any one of SBA1 to SBA4), three digits after n represent an address in hexadecimal notation. Each address position (one cell shown in FIG. 10) is obtained by respectively dividing the display into 32 parts in the vertical direction and the horizontal direction. Character designating data for designating a character to be displayed in the position is written into an address of the screen RAM 42 which corresponds to the position. In the character designating data, one word comprises 16 bits d0 to d15, a character code (or a character name) is designated by low order ten bits d0 to d9, a color palette is selected by three bits d10 to d12, the priority for each character among the background screens (BG1 to BG4) is designated by one bit d13, and the V flip and the H flip of the character are designated by high order two bits d14 and d15, as shown in FIG. 11. Although the priority data has only one bit per background screen, a background screen to be displayed by priority can be identified by combining the priority data with priority data of another background screen. Such character designating data has the same data structure in any mode.

On the other hand, in the character RAM 44, the number of bytes (the number of cells) for representing eight dots in the horizontal direction of one character differs and the maximum number of characters which can be displayed in one scene differs depending on cases where the number of cells (the number of colors) is restricted to increase the number of characters, the number of characters is restricted to increase the number of cells (the number of colors), and the number of data bits for each dot is increased to obtain fine and high picture quality. The conditions are determined on the basis of any one of the BG0 mode to the BG6 mode designated by the mode data. The capacity of one character stored in the character RAM 44 differs depending on the number of bits (the amount of data) for representing one dot.

For example, when one dot is represented by two bits, two cells m0 and m1 are used per character, the cell m0 being constituted by eight bytes (n to n+7) each having eight bits d0 to d7, the cell m1 being constituted by eight bytes (n to n+7) each having eight bits d8 to d15, as shown in FIG. 12. That is, one word (=two bytes) comprises 16 bits d0 to d15, and the bits d0 to d7 and the bits d8 to d15 in the same word respectively constitute pairs.

When one dot is represented by four bits, four cells m0 to m4 are used per character, the cells m0 and m1 being respectively constituted by eight words, i.e., n to n+7, the cells m2 and m3 being respectively constituted by eight words, i.e., n+8 to n+n 15, as shown in FIG. 13.

Figure 14:
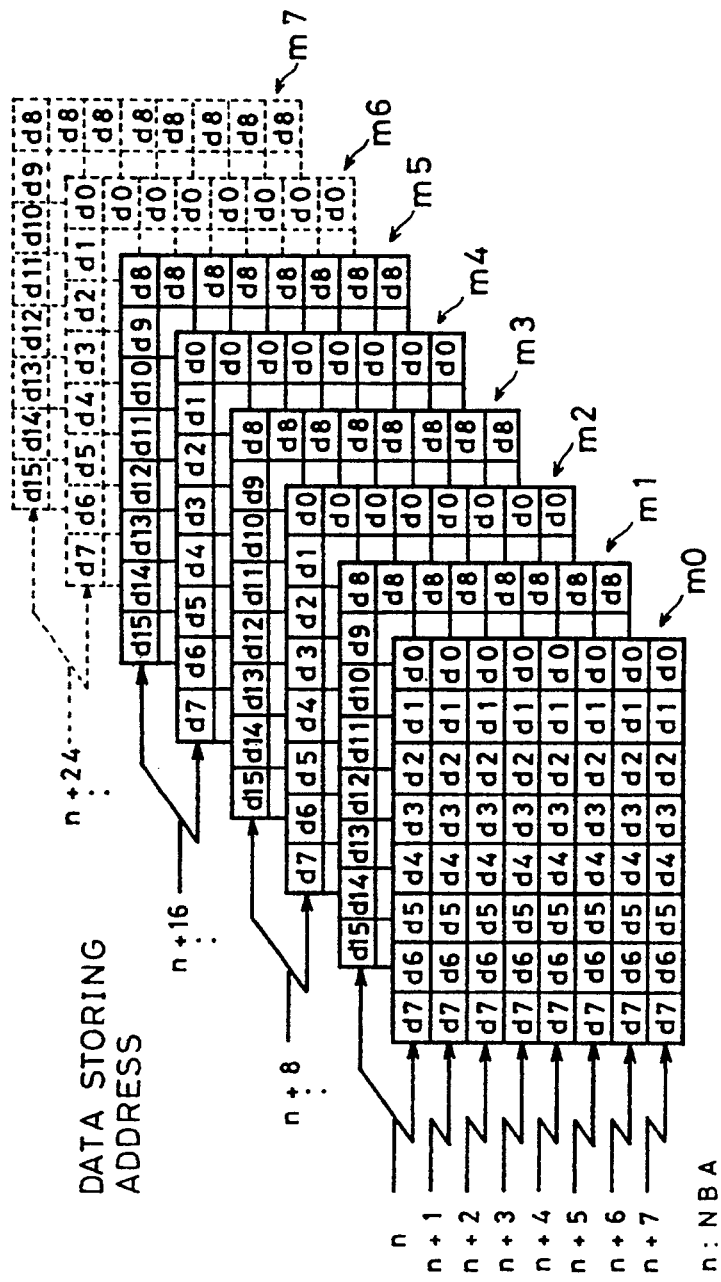
FIG. 14 is an illustrative view showing a data structure of one character stored in the character RAM.

When one dot is represented by eight bits, eight cells m0 to m7 are used per character, the cells m0 and m1, the cells m2 and m3, the cells m4 and m5, and the cells m6 and m7 being respectively constituted by eight words, i.e., n to n+7, n+8 to n+15, n+15 to n+23, and n+24 to n+31, as shown in FIG. 14.

The number of cells, the number of colors, and the like for each background screen (BG1 to BG4) are switched by changing the manner of writing into the screen RAM 42 and/or character RAM 44 included in the RAM 40 depending on which of the BG mode 0 to the BG mode 6 is used, whose details will be described later.

Referring now to a memory map for each BG mode of the RAM 40 shown in FIG. 15 and FIGS. 3 to 9, the relation among the number of cells in each background screen (BG) which characterizes the present embodiment, the number of colors, the number of dots on one line in the horizontal direction of one character, and the presence or absence of the offset change, and data in the RAM 40 corresponding to each BG mode will be described in detail.

Figure 3:
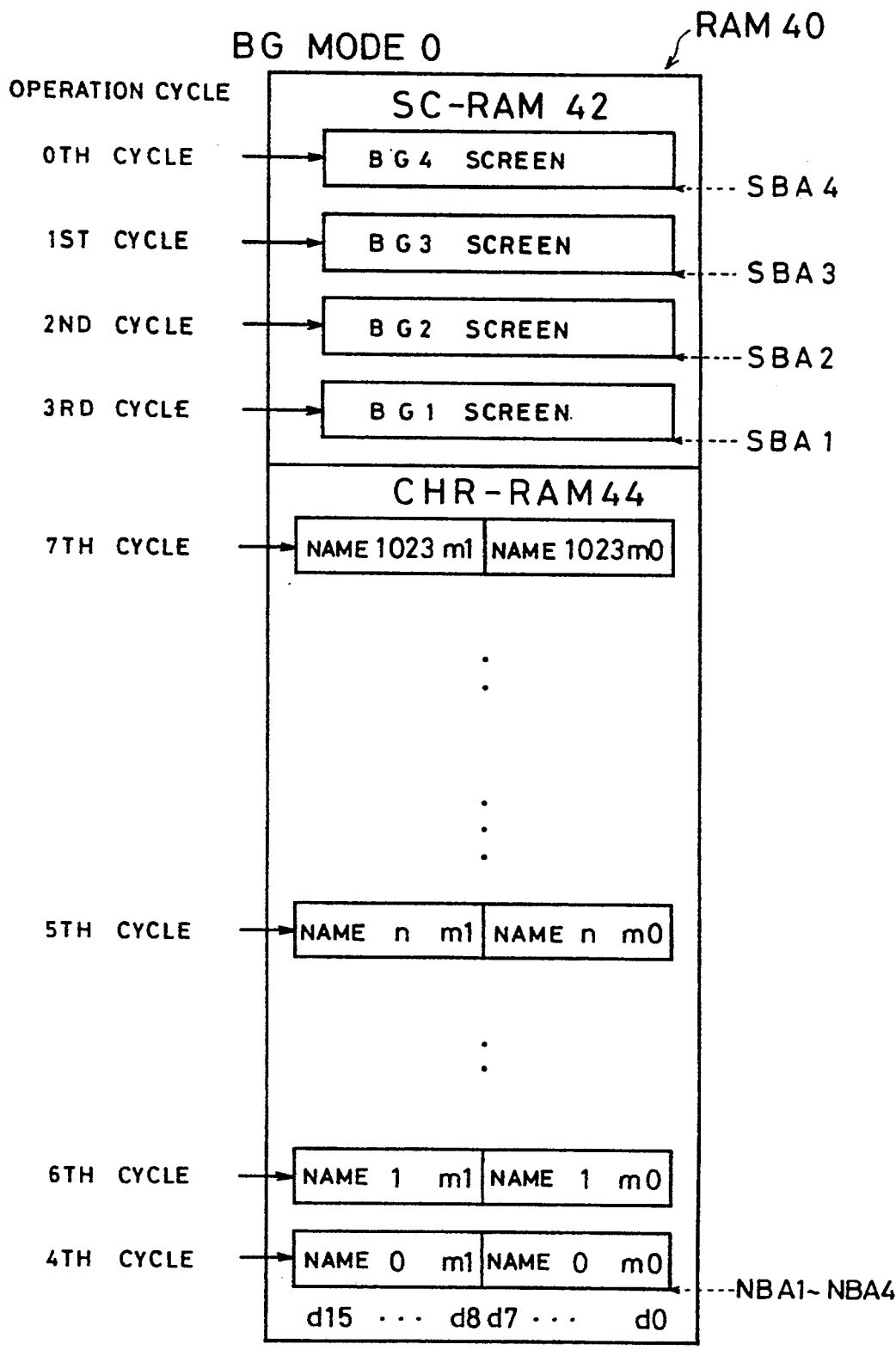
FIG. 3 is an illustrative view showing a memory map of a RAM in a BG mode 0.

In the BG mode 0, when four background screens are displayed, two cells m0 and m1 are used for each background screen (BG1 to BG4), thereby to make it possible to display four (=$2^2$) colors. In addition, this BG mode 0 is a mode for representing one line in the horizontal direction of one character by eight dots. A storing (or writing) format of the character designating data and the dot data in the screen RAM 42 and the character RAM 44 in this case is shown in FIG. 3.

Figure 4:
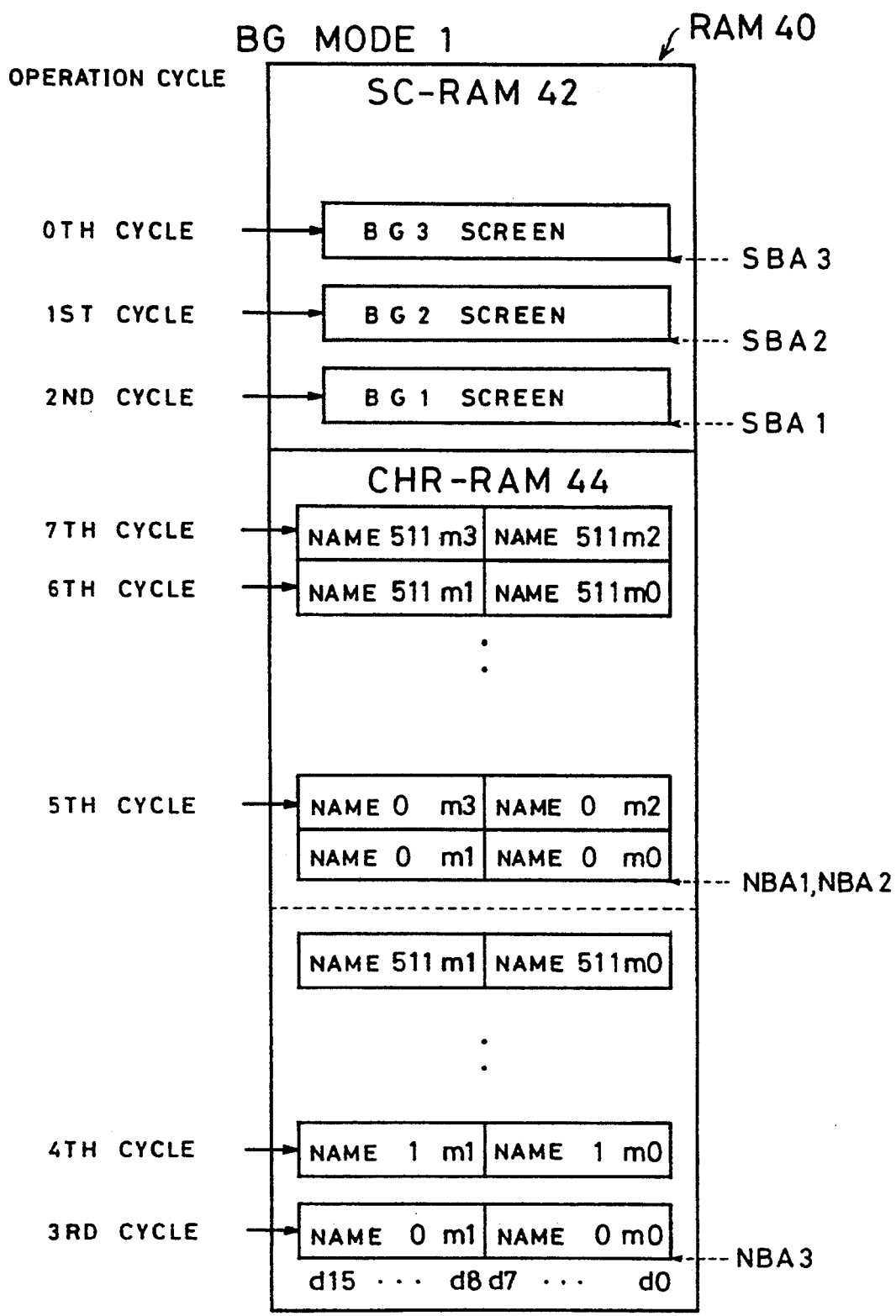
FIG. 4 is an illustrative view showing a memory map of the RAM in a BG mode 1.

In the BG mode 1, when three background screens are displayed, 16 (=$2^4$) colors can be displayed by using four cells m0 to m3 in the background screens BG1 and BG2, and four colors can be displayed by using two cells m0 and m1 in the background screen BG3. This BG mode 1 is a mode for representing one line in the horizontal direction of one character by eight dots. A storing format of the character designating data and the dot data in the screen RAM 42 and the character RAM 44 in the case is shown in FIG. 4.

Figure 5:
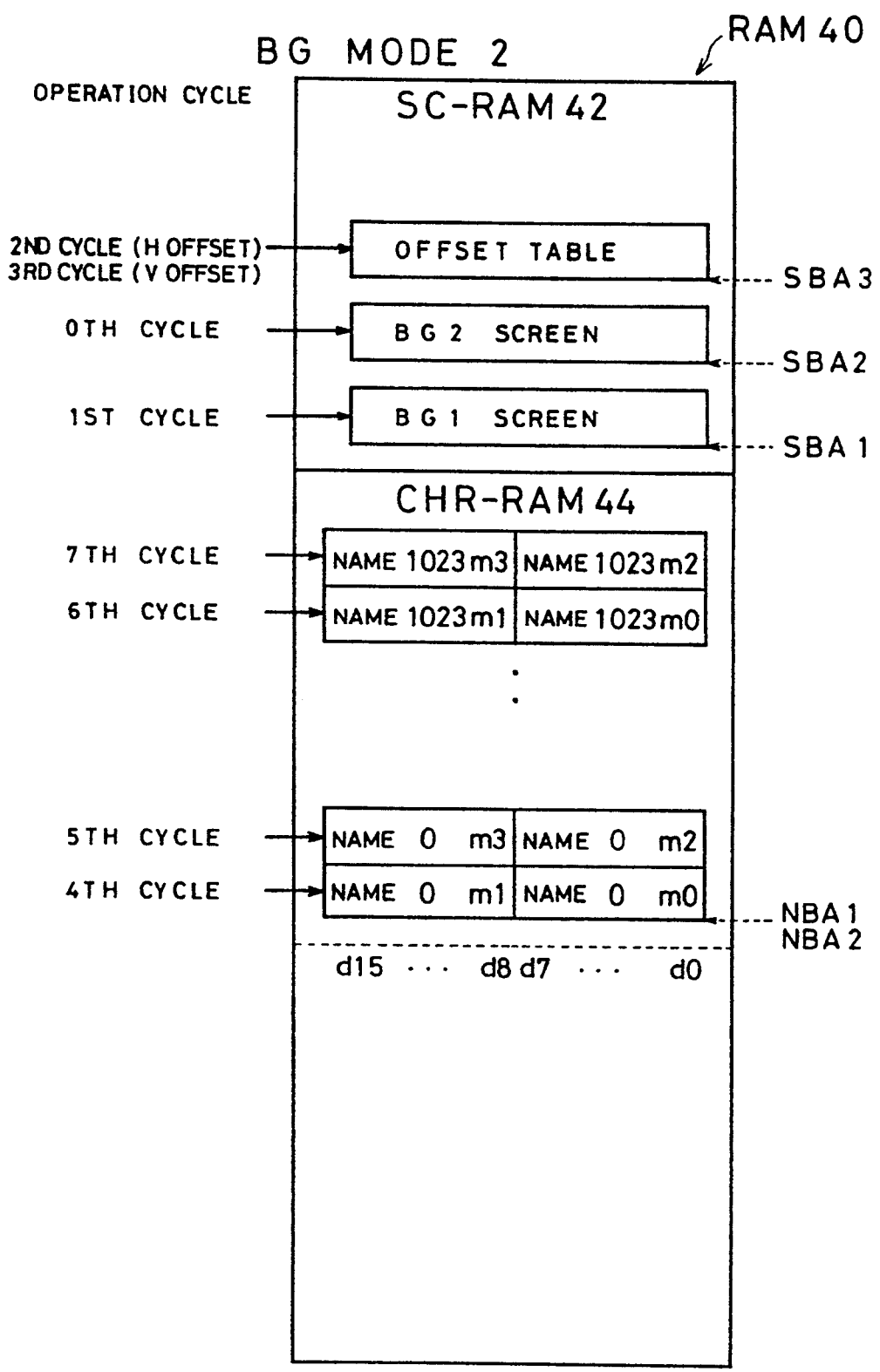
FIG. 5 is an illustrative view showing a memory map of the RAM in a BG mode 2.

In the BG mode 2, when two background screens are displayed, 16 (=$2^4$) colors can be displayed by using four cells m0 to m3 in the background screens BG1 and BG2. This BG mode 2 is a mode for representing one line in the horizontal direction of one character by eight dots. A storing format of the character designating data and the dot data in the screen RAM 42 and the character RAM 44 in the case is shown in FIG. 5.

Figure 6:
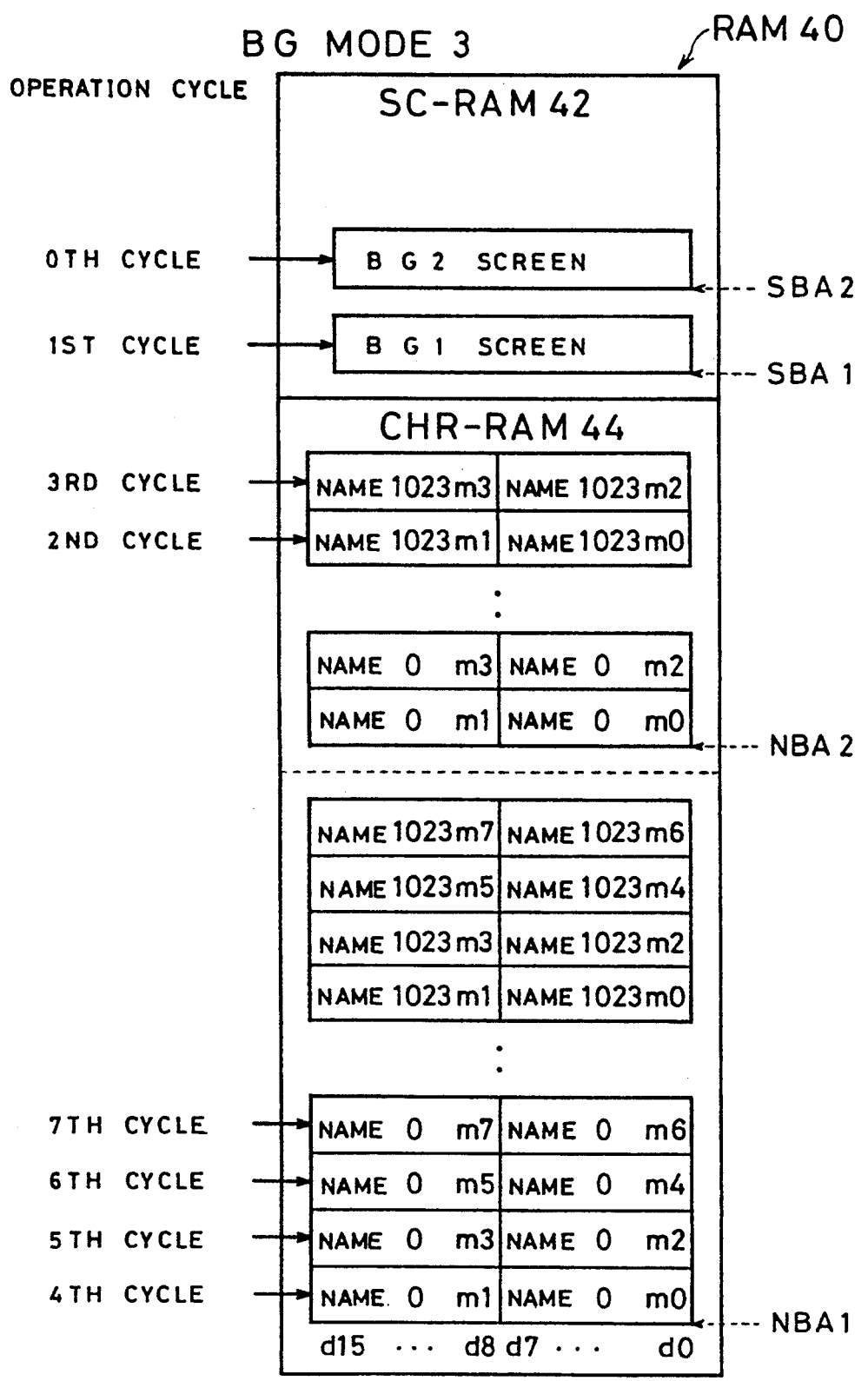
FIG. 6 is an illustrative view showing a memory map of the RAM in a BG mode 3.

In the BG mode 3, when two background screens are displayed, 256 (=$2^8$) colors can be displayed by using eight cells m0 to m7 in the background screen BG1, and 16 colors can be displayed by using four cells m0 to m3 in the background screen BG2. This BG mode 3 is a mode for representing one line in the horizontal direction of one character by eight dots. A storing format of the character designating data and the dot data in the screen RAM 42 and the character RAM 44 in the case is shown in FIG. 6.

Figure 7:
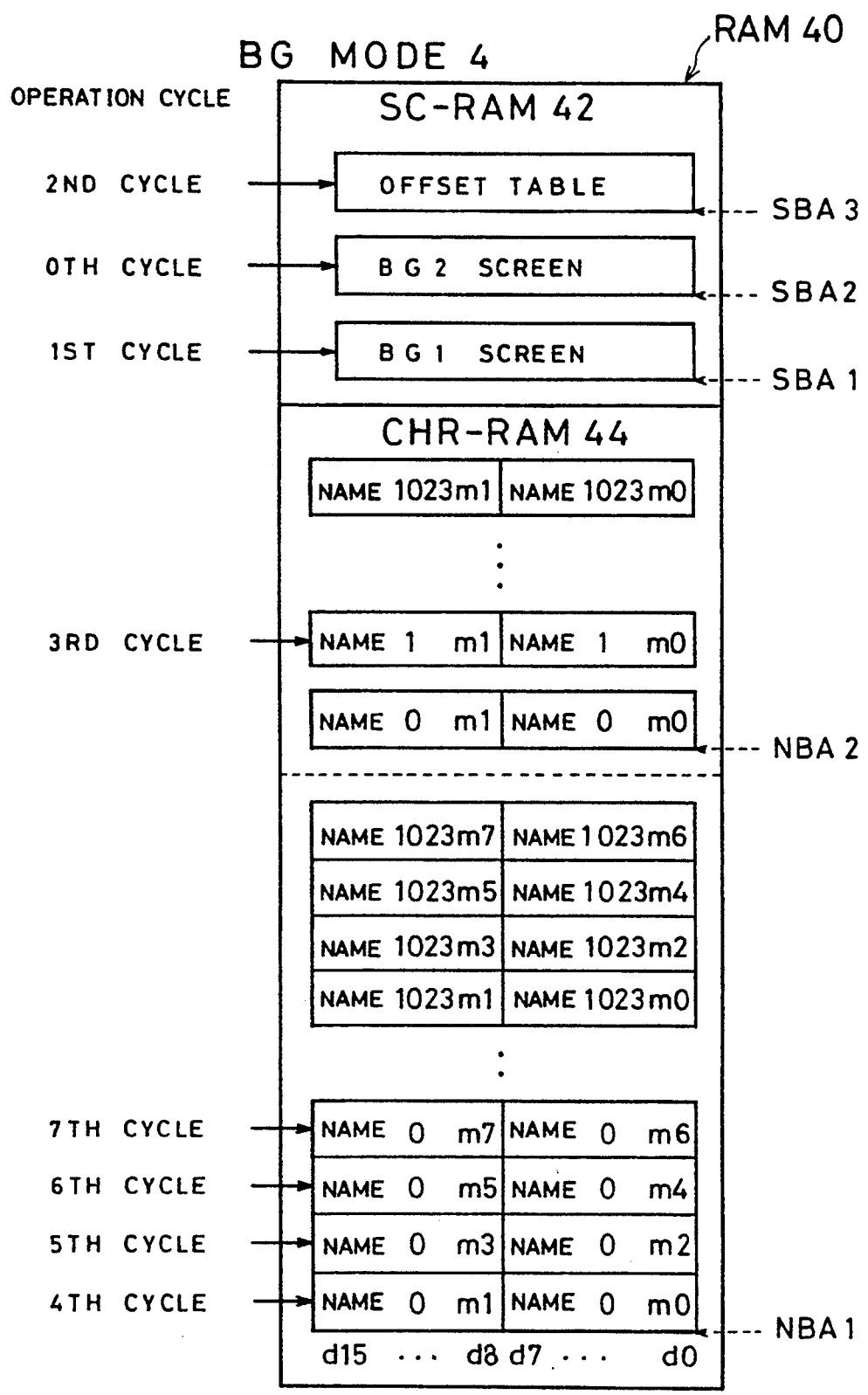
FIG. 7 is an illustrative view showing a memory map of the RAM in a BG mode 4.

In the BG mode 4, when two background screens are displayed, 256 (=$2^8$) colors can be displayed by using eight cells m0 to m7 in the background screen BG1, and four colors can be displayed by using two cells m0 and m1 in the background screen BG2. This BG mode 4 is a mode for representing one line in the horizontal direction of one character by eight dots. A storing format of the character designating data and the dot data in the screen RAM 42 and the character RAM 44 in the case is shown in FIG. 7.

Figure 8:
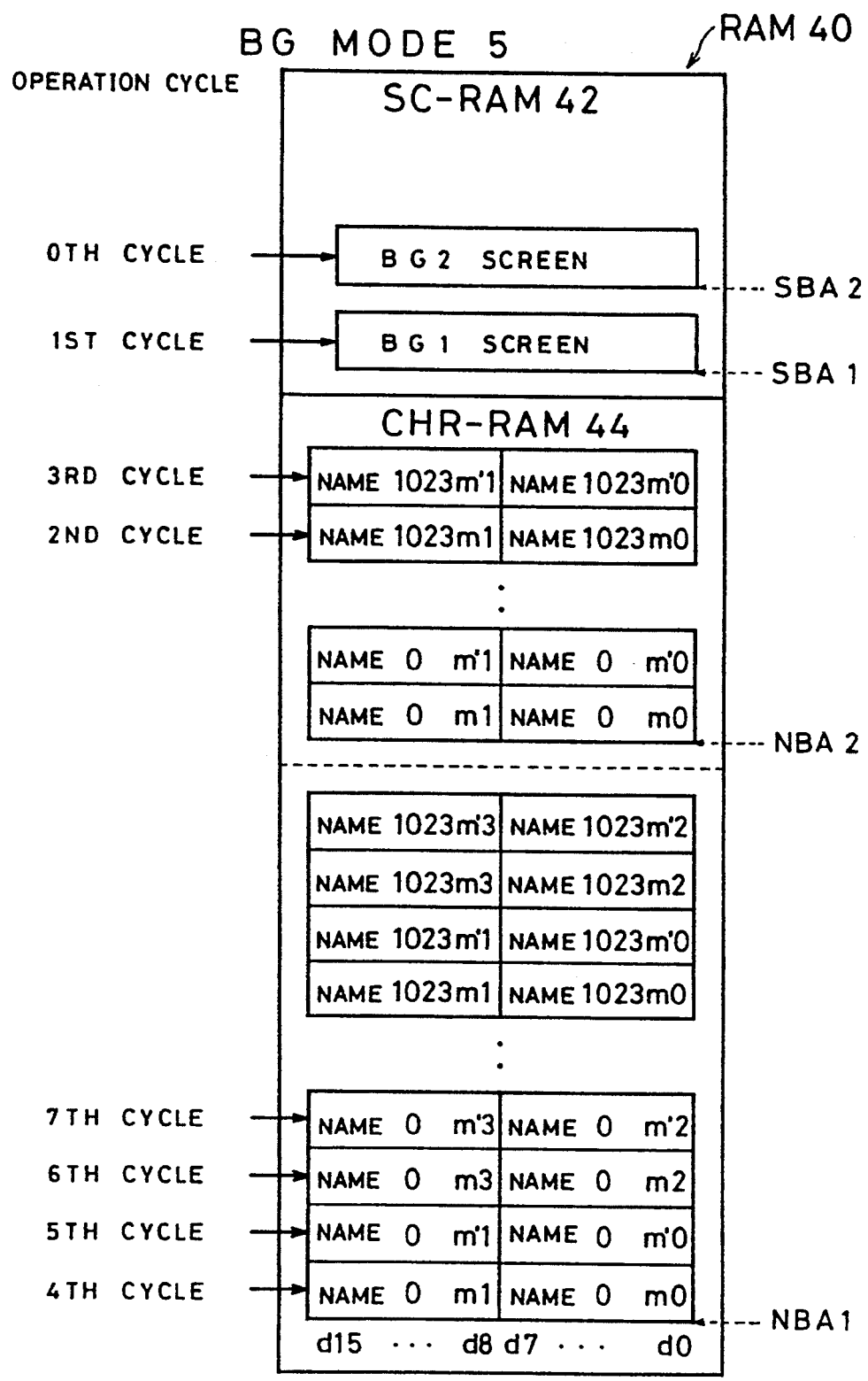
FIG. 8 is an illustrative view showing a memory map of the RAM in a BG mode 5.

In the BG mode 5, when two background screens are displayed, 16 colors can be displayed by using four cells m0 to m3 in the background screen BG1, and four colors can be displayed by using two cells m0 and m1 in the background screen BG2. This BG mode 5 is a mode for representing one line in the horizontal direction of one character by 16 dots (that is, the density in the BG mode 5 is two times that in the BG mode 0 to the BG mode 4). A storing format of the character designating data and the dot data in the screen RAM 42 and the character RAM 44 in the case is shown in FIG. 8.

Figure 9:
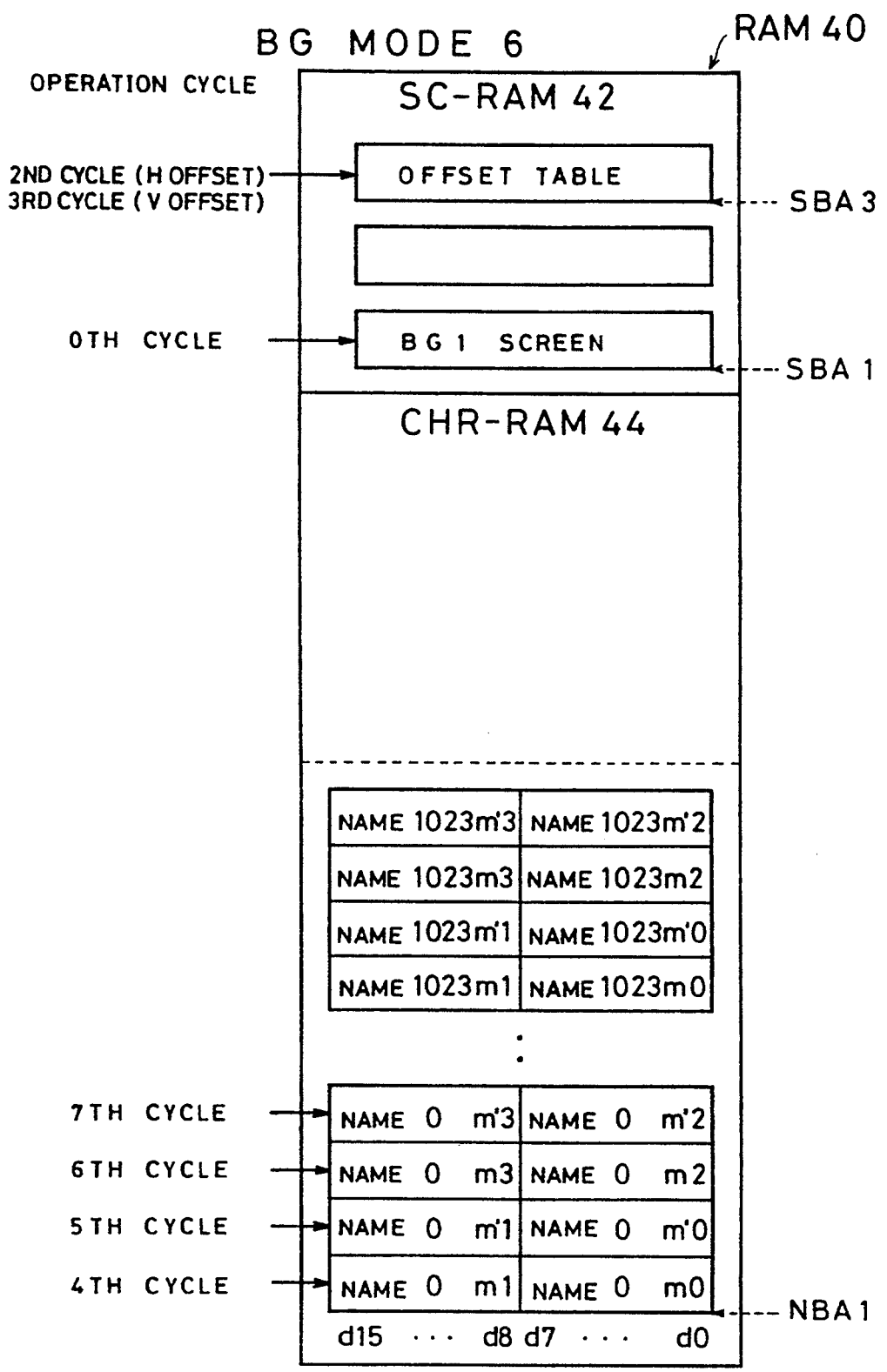
FIG. 9 is an illustrative view showing a memory map of the RAM in a BG mode 6.

In the BG mode 6, when one background screen is displayed, 16 colors can be displayed by using four cells m0 to m3 in the background screen BG1. This BG mode 6 is a mode for representing one line in the horizontal direction of one character by 16 dots. A storing format of the character designating data and the dot data in the screen RAM 42 and the character RAM 44 in the case is shown in FIG. 9.

In the BG mode 2, the background screen BG1 in the BG mode 4, or the BG mode 6, the offset is changeable. The offset change is to change a screen base address so as to move the entire background screen in the horizontal direction or the vertical direction (which is referred to as scrolling).

Description is now made of an operation in the embodiment shown in FIG. 1. As an example for explanation, it is assumed that a background screen is first displayed in the BG mode 0, and the BG mode 0 is changed into the BG mode 3 halfway.

First, prior to display in the BG mode 0, the microprocessor 12 reads out mode data for designating the BG mode 0 from the storage area 38c and temporarily stores the same in the mode register 14 on the basis of program data in the transfer program storage area 38d at the time of initialization or during the blanking (including both horizontal blanking and vertical blanking) period of the display. At the same time, respective character designating data constituting the background screens BG1 to BG4 are read from the storage area 38b and are written into the screen RAM 42, and a plurality of (for example, a maximum of 1024) dot data used in each of the background screens BG1 to BG4 are further read from the storage area 38a and are written into the character RAM 44. The state of the screen RAM 42 and the character RAM 44 at this time is shown in FIG. 3, as described above.

Thereafter, data are read from the screen RAM 42 and the character RAM 44 in synchronization with scanning of the display. More specifically, the HV counter 22 generates a count value Hc corresponding to the horizontal position of an electron beam and a count value Vc corresponding to the vertical position thereof in synchronization with electron beam scanning of the display and applies the count values to the timing signal generation circuit 20, the screen address circuit 16 and the character address circuit 18. Responsively, the timing signal generation circuit 20 generates signals in eight cycles, i.e., the 0-th cycle to the 7th cycle while the electron beam is moved by one dot on the display, and applies a 0-th cycle signal to a 3-rd cycle signal to the screen address circuit 16 while applying a 4-th cycle signal to a 7-th cycle signal to the character address circuit 18.

Figure 17:
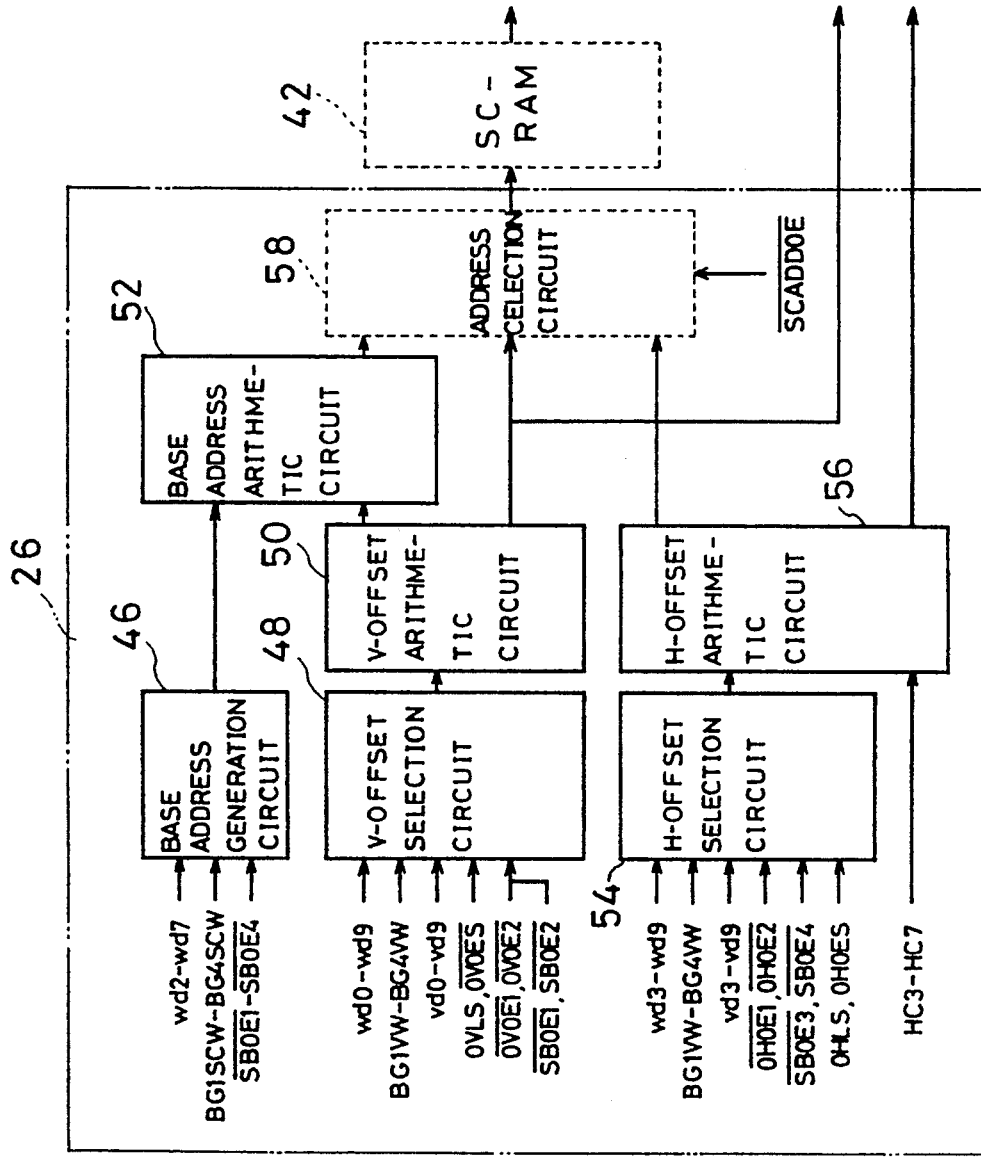
FIG. 17 is a block diagram showing a screen address circuit in the embodiment shown in FIG. 1.

The screen address circuit 18 generates addresses having screen base addresses SBA4, SBA3, SBA2 and SBA1 corresponding to the background screens BG4, BG3, BG2 and BG1 added to an address (any one of 000H to 3FFH) representing a display position corresponding to the count values Hc and Vc at that time sequentially for each cycle at respective timings of the 0-th cycle to the 3-rd cycle, to designate a read address of the screen RAM 42. More specifically, the screen address circuit 16 includes a base address generation circuit 46, a V-offset selection circuit 48, a V-offset arithmetic circuit 50, a base address arithmetic circuit 52, an H-offset selection circuit 54, an H-offset arithmetic circuit 56, and an address selection circuit 58, as shown in FIG. 17. H-offset data is outputted from the H-offset selection circuit 54, and is added to the output from the HV counter 22, that is, the count value Hc by the H-offset arithmetic circuit 56. On the other hand, V-offset data is outputted from the V-offset selection circuit 48, and is added to the count value Vc (or its modified value) from the HV counter 22 by the V-offset arithmetic circuit 50. On the other hand, screen base addresses obtained by the base address generation circuit 46 and the base address arithmetic circuit 52, together with respective outputs from the V-offset arithmetic circuit 50 and the H-offset arithmetic circuit 56, are applied to the address selection circuit 58. The address selection circuit 58 converts the inputs depending on the character size, interlace or non-interlace, and applies the same to the screen RAM 42 as screen addresses. Responsively, character designating data (see FIG. 11) are read from the screen RAM 42. More specifically, character codes (d0 to d9) included in the character designating data constituting each of the background screens BG1 to BG4 are applied to the character address circuit 18 as data for designating an address of the character RAM 44. Meanwhile, palette data (d10 to d2) from the character RAM 44 is applied to the color signal generation circuit 34, and BG priority data (d13) is applied to the priority circuit 32.

Figure 18:
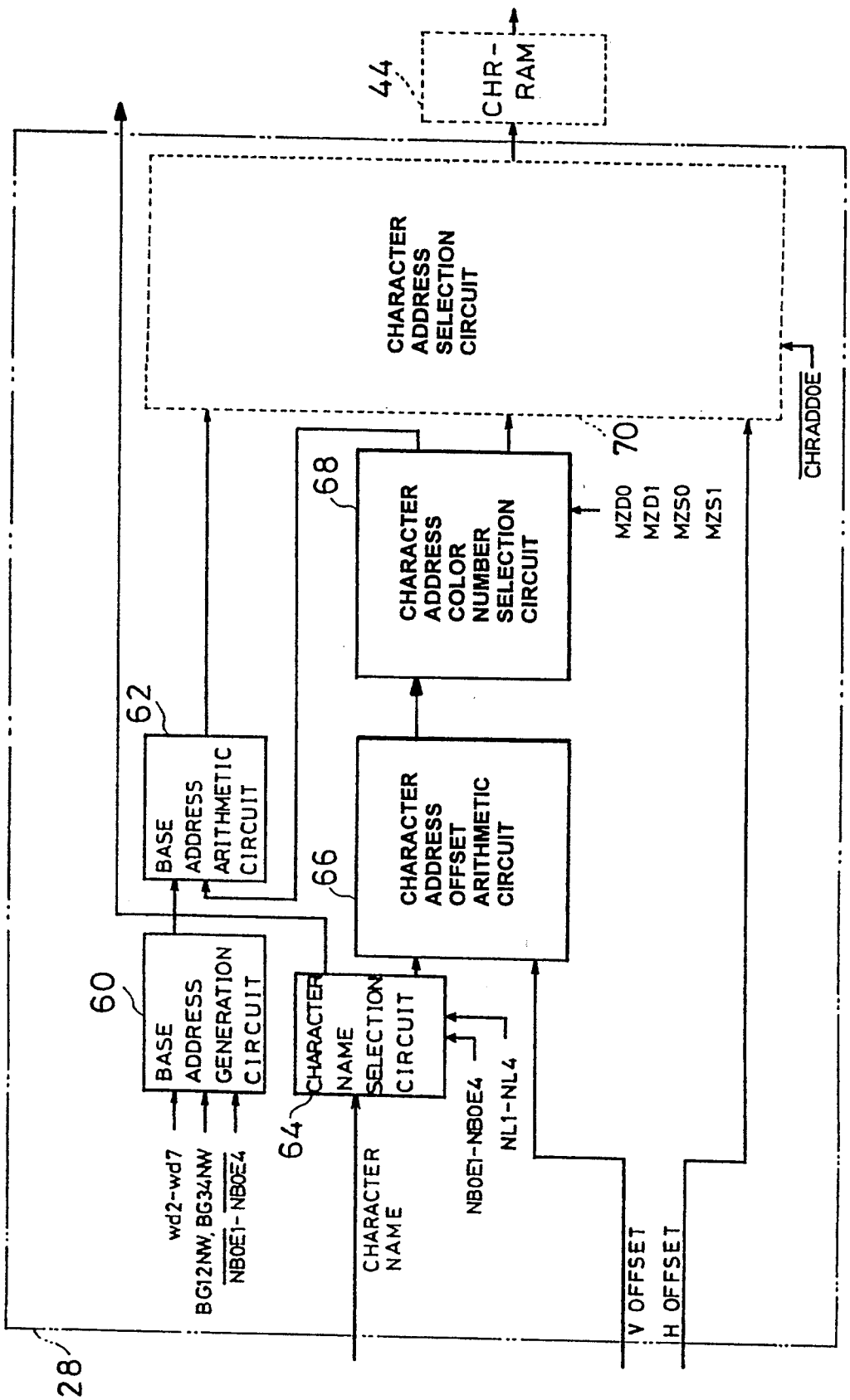
FIG. 18 is a block diagram showing a character address circuit in the embodiment shown in FIG. 1.

On the other hand, the character address circuit 18 outputs character addresses on the basis of the character designating data constituting the background screens BG1 to BG4 sequentially read in the 0-th cycle to the 3-rd cycle and in synchronization with timings of the 4-th cycle to the 7-th cycle. More specifically, the character address circuit 18 includes a base address generation circuit 60, a base address arithmetic circuit 62, a character name selection circuit 64, a character address offset arithmetic circuit 66, a character address color number selection circuit 68, and a character address switching circuit 70, as shown in FIG. 18. A character name included in the character designating data is outputted from the character name selection circuit 64, and is applied to the character address offset arithmetic circuit 66. V-offset data is applied to the character address offset arithmetic circuit 66, and is added to character name data in the character address offset arithmetic circuit 66. The results of the addition are applied to the character address selection circuit 70 and the base address arithmetic circuit 62 through the character address color number selection circuit 68. The base address arithmetic circuit 62 adds the output from the character address color number selection circuit 68 to a name base address NBA outputted from the base address generation circuit 60, and applies the results of the addition to the character address selection circuit 70. Consequently, the character address selection circuit 70 applies to the character RAM 44 either one of the addresses inputted to the character address selection circuit 70 depending on the presence or absence of the offset, the H flip and/or the V flip. Responsively, character names (character codes) in the character RAM 44 are designated in the order of 0, n, 1 and 1023 in, for example, the example shown in FIG. 3 and at the same time, dot data of two bits corresponding to each other are read on the basis of the count values Hc and Vc from the timing signal generation circuit 20.

Figure 19:
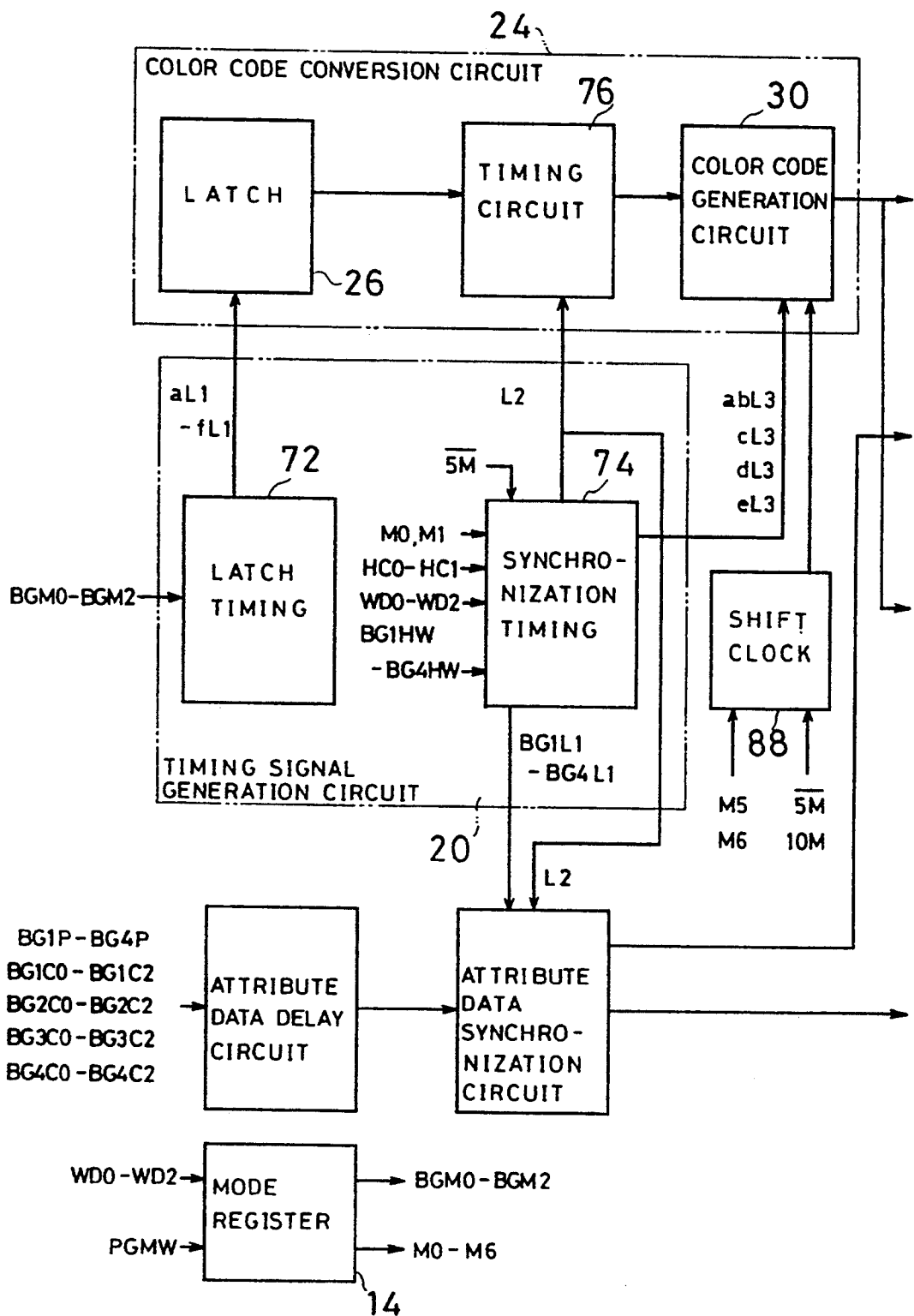
FIG. 19 is a block diagram showing a color code conversion circuit according to the embodiment shown in FIG. 1.

Dot data of the names 0, n, 1 and 1023 read at the timings of the 4-th cycle to the 7-th cycle are respectively latched in the four latch circuits 26a to 26d of the latch circuit 26 of 16 bits (see FIG. 1), in this order, in a bit parallel fashion. This data, that is, color data corresponding to eight dots in the horizontal direction of one character which corresponds to a certain display position of each of the background screens BG1 to BG4 (data of two bits for designating four colors per dot) is applied to the parallel-serial conversion circuit 28 in a bit parallel fashion. The parallel-serial conversion circuit 28 reads the bit parallel data in response to a write signal W from the timing signal generation circuit 20, that is, a signal from a latch timing circuit 72 shown in FIG. 19 and temporarily stores the same. The parallel-serial conversion circuit 28 converts the bit parallel data into bit serial data in synchronization with a read clock Clock applied in a period which is two times a time period during which the electron beam is moved by one dot, that is, in response to a signal from a synchronization timing circuit 74 shown in FIG. 19 and applies the same to the dot data combination circuit 30 (see FIGS. 1 and 19).

Figure 20:
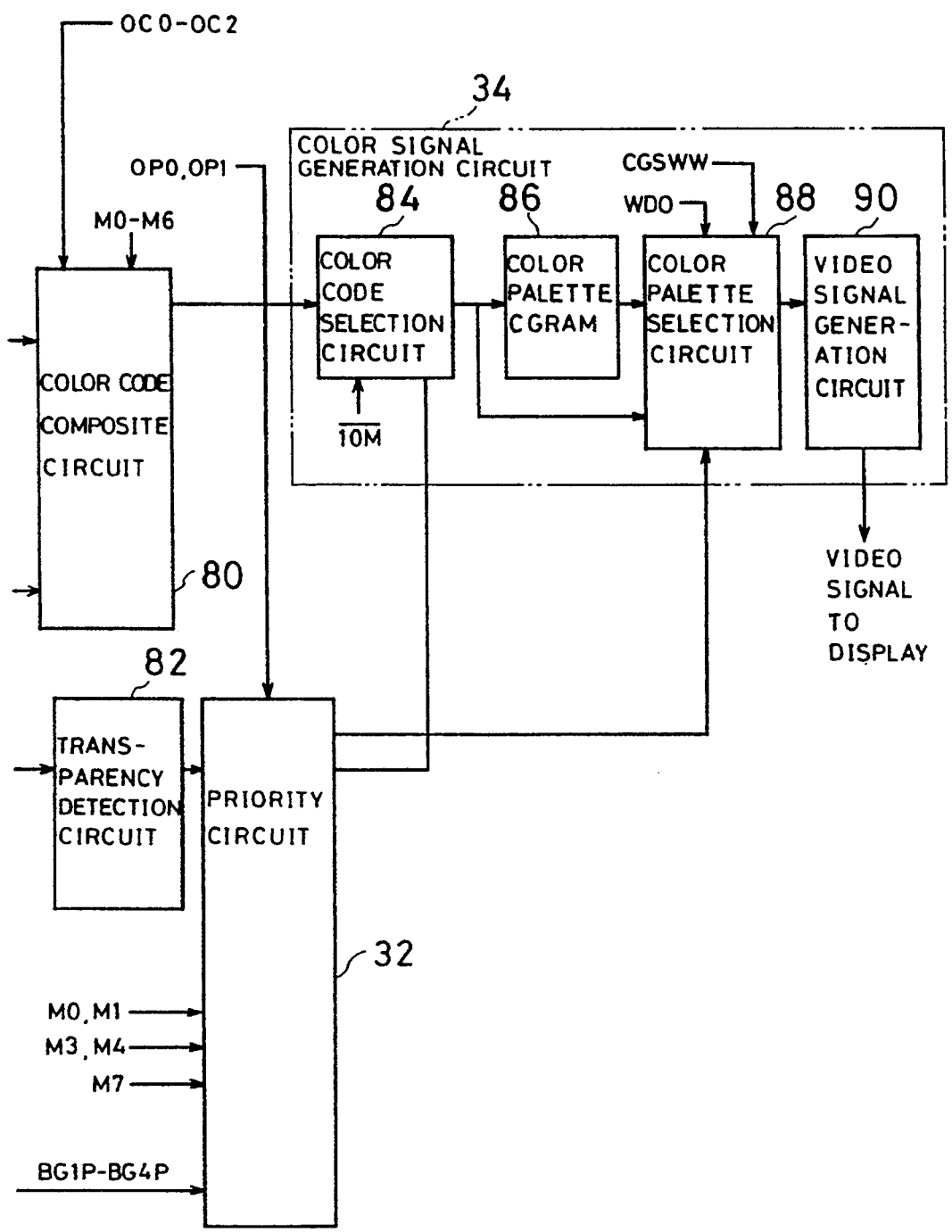
FIG. 20 is a block diagram showing an output circuit according to the embodiment shown in FIG. 1.

The dot data combination circuit 30 combines pairs of serial data, i.e., a0 and a1, b0 and b1, c0 and c1, d0 and d2, e0 and e1, and f0 and f1 outputted from the parallel-serial conversion circuit 28 with bits whose number corresponds to the number of cells on the basis of the mode data. Consequently, color data for each background screen (BG4 to BG1) is outputted and is applied to the priority circuit 32 (see FIGS. 1 and 20). The priority circuit 32 applies color data of a higher priority background screen to the color generation circuit 34 (see FIGS. 1 and 20) on the basis of the mode data and the priority data. Meanwhile, when a transparency detection circuit 82 (see FIG. 20) is provided and the color data of the higher priority background screen is indicative of transparency, color data of a second-highest priority background screen is outputted. Responsively, the color generation circuit 34 generates a color video signal (an analog signal) determined by a combination of the color data and palette data and applies the same to the display. More specifically, the dot data for each background screen is applied as a color code to a color code composite circuit 80, and is combined with a color code of a moving character in the color code composite circuit 80 and is applied to the color signal generation circuit 34. At this time, the function of the priority circuit 32 causes only a color code of a character to be displayed by priority to be made effective by a color code selection circuit 84. A signal is outputted from a color palette selection circuit 88 on the basis of palette data from a color palette (CGRAM) 86 and the color code, and is applied to a video signal generation circuit 90. Consequently, a color video signal is obtained from the video signal generation circuit 90.

The above described operations are repeated with respect to the background screens BG1 to BG4, thereby to form one scene. When the same background screen is displayed, the same operation is repeated over frames in synchronization with scanning of the display without rewriting the data in the screen RAM 42 and the character RAM 44.

Furthermore, the background screen can be also changed without changing the BG mode. In this case, however, the microprocessor 12 may read the character designating data and the dot data from the storage areas 38b and 38a without reading the mode data and write the data into the screen RAM 42 and the character RAM 44.

Meanwhile, when it is desired to increase the number of colors instead of decreasing the number of background screens while the background screen is being displayed in the above described BG mode 0, the following operation is performed. More specifically, the microprocessor 12 reads out mode data for designating the BG mode 3 on the basis of the program in the transfer program storage area 38d and temporarily stores the same in the mode register 14 at the time of initialization or during the blanking period. In addition, the microprocessor 12 writes the character designating data constituting the background screens BG2 and BG2 stored in the storage area 38b into corresponding areas in the screen RAM 42, while writing the dot data to be displayed as the background screens BG1 and BG2 stored in the storage area 38a into corresponding areas in the character RAM 44. In this case, since the background screen BG1 has eight cells m0 to m7 and the background screen BG2 has four cells m0 to m3, the dot data used in the background screen BG1 is written into each of the cells m0 to m7 in the name base address (NBA) 1, and the dot data used in the background screen BG2 is written into each of the cells m0 to m4 in the NBA 2.

On the other hand, in the BG mode 3, reading from the screen RAM 42 and the character RAM 44 is achieved in the 0-th cycle period and the 1-st cycle period because the number of background screens is smaller and the number of cells is larger than those in the BG mode 0. In addition, the dot data corresponding to the background screen BG2 in the character RAM 44 is read in two cycles, i.e., the 2-nd cycle and the 3-rd cycle, and the dot data corresponding to the background screen BG1 is read in four cycles, i.e., the 4-th cycle to the 7-th cycle. The other operations are almost the same as those in the BG mode 0 and hence, the detailed description is omitted.

If the number of background screens constituting one scene, the number of cells (that is, the number of colors) usable in each of the background screens, and the number of dots on one line in the horizontal direction of one character are switched based on the BG mode as in the present embodiment, the capability of the microprocessor 12 to display a picture can be maximized within a limited time. In addition, the data previously written into the external memory 36, that is, the ROM 38 is read as required. Accordingly, if the storage capacity of the RAM 40 is small, a variety of background pictures can be displayed by only altering the BG mode, thereby to make it possible to efficiently use the RAM 40.

Although in the above described embodiment, description was made of a case where the character designating data generation means and the dot data generation means comprise the ROM 38 and the RAM 40 and the data stored in the ROM 38 is transferred to the RAM 40, mode data, character designating data and character pattern data may be stored in the ROM in relation to each display screen if it is necessary to only achieve the maximum processing capability of the microprocessor 12.

In addition, although in the above described embodiment, a memory cartridge is used as the external storage unit, an external storage such as a CD-ROM can be utilized in the present invention. When the memory cartridge is used, the ROM 38 contained in the memory cartridge stores, for example, the above described program data including the character designating data, the dot data and the mode data, and the microprocessor 12 controls the display of the background picture on the basis of the program data.

On the other hand, when the CD-ROM is used, program data as described above, for example, is optically recorded as digital data in the CD-ROM (not shown). In addition, an optical reader for optically reading the data recorded in the CD-ROM is connected to a suitable connector, for example, an extended connector (not shown). When the CD-ROM is used, the memory cartridge is also used. In this case, however, the memory cartridge includes a ROM (not shown) storing start program for controlling an operation of the optical reader and a buffer RAM (not shown) for temporarily storing the program data read from the CD-ROM. Prior to starting a display operation, the microprocessor 12 applies control data to the optical reader on the basis of the start program in the ROM, to read the data recorded in the CD-ROM. A part of the character designating data read from the CD-ROM is transferred to the screen RAM 42, and the dot data is similarly transferred to the character RAM 44. Meanwhile, the other program data including the mode data is transferred to the buffer RAM in the memory cartridge. After the data in the CD-ROM read by the optical reader is transferred once to the respective memories, the microprocessor 12 performs the above described operations by accessing the respective memories.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A background picture display apparatus for displaying on a raster scan type display a background picture in which N characters and M characters each comprising a predetermined number of dots which are respectively arranged in a horizontal direction and a vertical direction to represent one background screen and a plurality of background screens constitute one scene, comprising:
   mode data generation means for generating mode data for designating for each scene the number of background screens and the number of cells used in each of the background screens;
   character pattern data storage means for storing pattern data of a plurality of characters which display one scene with two or more cells per one dot for each of said respective characters;
   character designating data storage means having a storage area which can store character designating data for designating N×M characters for each of the background screens whose number can be designated by said mode data generation means;
   parallel-serial conversion means provided in the number associated with the number of the background screens and the number of the cells designated by said mode data generation means, each of said parallel-serial conversion means temporarily storing the pattern data corresponding to the number of dots in the horizontal direction of one character in a bit parallel fashion and outputting the same in a bit serial fashion;
   first reading means for reading the character designating data in synchronization with horizontal scanning of said display;
   second reading means for reading from said character pattern storage means in synchronization with horizontal scanning of said display and on the basis of the character designating data read from said character designating data storage means applying the same to the parallel-serial conversion means; and
   video signal generation means for generating a video signal color data designated by the cells of the background screen outputted from said parallel-serial conversion means, wherein the number of background screens in each scene and the number of colors usable in each of the background screens can be arbitrarily set by said mode data.

2. A background picture display apparatus according to claim 1, wherein said character designating data storaqe means includes priority data for determining priority, and further comprising priority means for selecting color data of each of the background screens outputted from said parallel-serial conversion means by priority on the basis of said priority data and applying the same to said video signal generation means.

3. A background picture display apparatus according to claim 1, wherein
- said character designating data storage means includes first nonvolatile storage means for fixedly storing all character designating data used in a plurality of scenes, and first temporary storage means into which all character designating data constituting at least one background screen to be displayed in one scene, which are read from the first nonvolatile storage means and are designated by said mode data, are written, and
- said character-pattern storage means includes second nonvolatile storage means for fixedly storing dot pattern data of all characters used in a plurality of scenes, and second temporary storage means into which dot pattern data of characters, which are read from the second nonvolatile storage means and are to be displayed in one scene, are written,
- said first reading means reading the character designating data stored in said first temporary storage means, and
- said second reading means reading the dot pattern data stored in said second temporary storage means.

4. A background picture display apparatus according to claim 1, further comprising timing signal generation means, said timing signal generation means including first clock signal generation means for generating a low speed clock signal, second clock signal generation means for generating a high speed clock signal, and means for selecting said low speed clock signal or said high speed clock signal on the basis of said mode data and applying the same to the parallel-serial conversion means.

5. An external storage unit used for a background picture display apparatus for displaying on a raster scan type display a background picture in which N characters and M characters each comprising a predetermined number of dots which are respectively arranged in a horizontal direction and a vertical direction to represent one background screen and a plurality of background screens constitute one scene, comprising:
- program data storage means for storing program data required to display said background picture, said program data storage means including a mode data storage area for storing mode data for designating the number of background screens constituting said scene and the number of cells used in each of the background screens, a dot data storage area for storing dot data of a plurality of characters each comprising not less than two cells per dot, a character designating data storage area having a storage area which can store a maximum of N×M characters and their display positions for each of the background screens whose number can be designated by said mode data, and a transfer program data storage area for storing program data for transferring said mode data, said dot data and said character designating data,
- wherein said background picture display apparatus comprising a writable/readable memory, data transfer means for transferring said character designating data and said dot data to said writable/readable memory on the basis of said transfer program data stored in said program data storage means, mode data reading means for reading said mode data from said mode data storage area, first reading means for reading the character designating data from said writable/readable memory in synchronization with horizontal scanning of said raster scan type display, second reading means for reading from said writable/readable memory the dot data of each of the characters designated by said character designating data in synchronization with horizontal scanning of said raster scan type display, parallel-serial conversion means for temporarily storing the dot data read by said second reading means for each predetermined number in a bit parallel fashion and outputting the same in a bit serial fashion, output means for outputting dot data for each background screen designated by the mode data from said mode data reading means by combining the dot data outputted from said parallel-serial conversion means, and video signal generation means for generating a video signal on the basis of the dot data for each background screen outputted from said output means, whereby
- the number of background screens in each scene displayed in said background picture display apparatus and the number of colors usable in each of the background screens are arbitrarily set by previously writing the mode data into said mode data storage area in said program data storage means.

* * * * *